US012613916B2

(12) United States Patent
Chandrashekar et al.

(10) Patent No.: US 12,613,916 B2
(45) Date of Patent: Apr. 28, 2026

(54) SYSTEMS AND METHODS TO INCREASE VIEWERSHIP OF ONLINE CONTENT

(71) Applicant: Adeia Guides Inc., San Jose, CA (US)

(72) Inventors: Padmassri Chandrashekar, Karnataka (IN); Daina Emmanuel, Bangalore (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/236,599

(22) Filed: Apr. 21, 2021

(65) Prior Publication Data

US 2022/0342930 A1 Oct. 27, 2022

(51) Int. Cl.
*G06F 16/78* (2019.01)
*G06F 16/738* (2019.01)

(52) U.S. Cl.
CPC ........ *G06F 16/7867* (2019.01); *G06F 16/738* (2019.01)

(58) Field of Classification Search
None
See application file for complete search history.

(56) References Cited

U.S. PATENT DOCUMENTS

| | | | | |
|---|---|---|---|---|
| 9,639,634 | B1 * | 5/2017 | Greene | G06F 16/90328 |
| 2005/0114357 | A1 * | 5/2005 | Chengalvarayan | G11B 27/034 |
| 2011/0173176 | A1 * | 7/2011 | Christensen | G06Q 30/02 |
| | | | | 707/E17.108 |
| 2012/0072435 | A1 * | 3/2012 | Han | G06F 40/169 |
| | | | | 707/754 |

| | | | | |
|---|---|---|---|---|
| 2013/0179806 | A1 * | 7/2013 | Bastide | G06F 3/0481 |
| | | | | 715/760 |
| 2013/0291079 | A1 * | 10/2013 | Lowe | G06F 21/00 |
| | | | | 726/7 |
| 2015/0220615 | A1 * | 8/2015 | Wexler | G06F 16/23 |
| | | | | 707/740 |
| 2016/0019659 | A1 * | 1/2016 | Doganata | H04L 51/52 |
| | | | | 705/319 |
| 2016/0227282 | A1 * | 8/2016 | Chang | H04N 21/4334 |

(Continued)

OTHER PUBLICATIONS

Yang Chao et al.: "Sentiment Enhanced Multi-Modal Hashtag Recommendation for Micro-Videos", IEEE Access, IEEE, USA, vol. 8, Apr. 22, 2020, pp. 78252-78264, XP011786486, DOI: 10.1109/ACCESS.2020.2989473 [retrieved on May 5, 2020].

*Primary Examiner* — Giuseppi Giuliani
(74) *Attorney, Agent, or Firm* — HG LAW LLP

(57) ABSTRACT

Systems and methods for automatically generating preliminary hashtag(s) for a video asset uploaded to an online platform and sampling them with related videos on the online platform are disclosed. Upon the upload of the video asset, the system automatically analyzes the metadata associated with the video asset to generate preliminary hashtags. The preliminary hashtags are used to find and sample related videos that include one or more hashtags that are related to the preliminary hashtag. Based on the sampling analysis, a determination is made whether to retain or delete the preliminary hashtag and whether to adopt the one or more hashtags from the related videos. The video asset may be tagged with the preliminary hashtag and/or the adopted hashtag if the hashtag is approved by the user and complies with the platform policy. The tagged hashtag may be updated to keep it current and periodically sampled with related video assets.

19 Claims, 14 Drawing Sheets

(56)                References Cited

U.S. PATENT DOCUMENTS

2020/0327149 A1 *  10/2020  Brennenstuhl ...... G06F 16/2365
2020/0329002 A1 *  10/2020  Wiklof ................... H04L 51/18
2021/0326718 A1 *  10/2021  Olson ...................... G06N 5/04
2021/0374797 A1 *  12/2021  Hasan ................ G06Q 30/0246

* cited by examiner

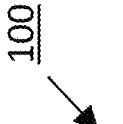
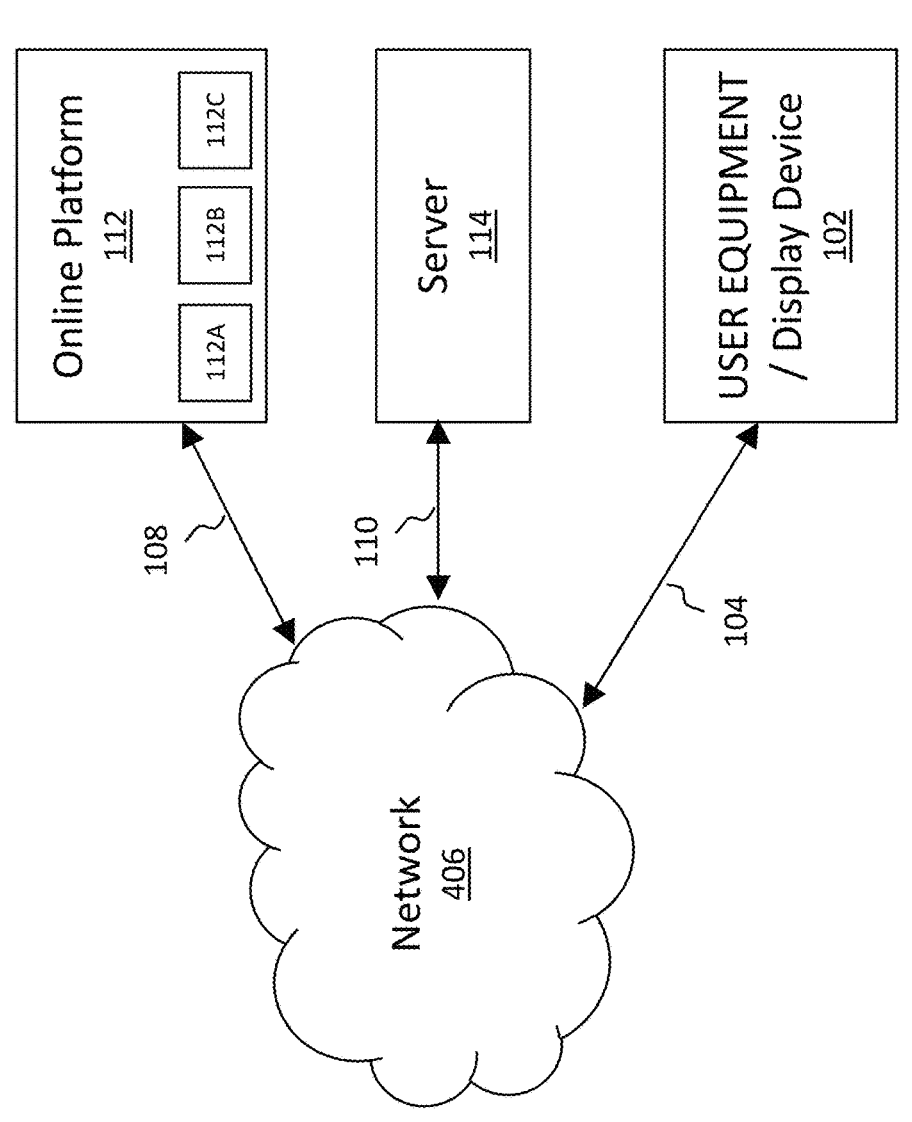
FIG. 1

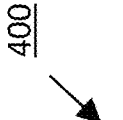
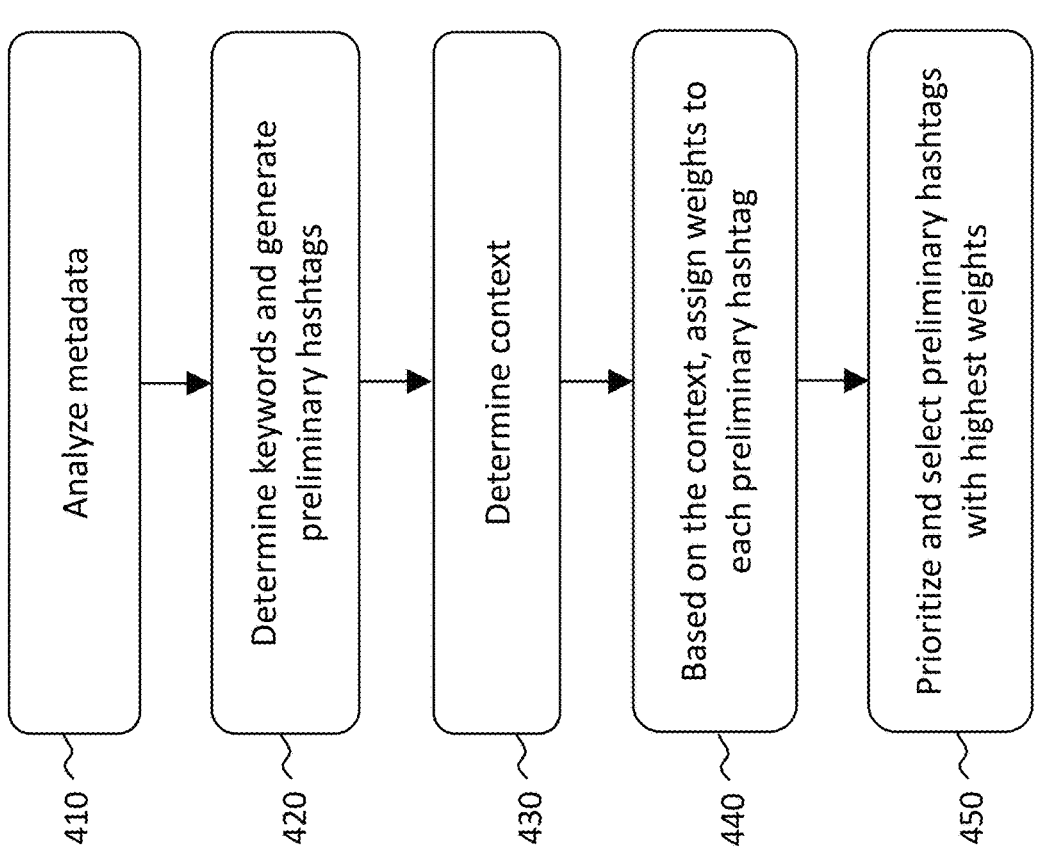
400
410 — Analyze metadata
420 — Determine keywords and generate preliminary hashtags
430 — Determine context
440 — Based on the context, assign weights to each preliminary hashtag
450 — Prioritize and select preliminary hashtags with highest weights
FIG. 4

Context: Top NBA performers in the 2021 season

| Primary Hashtag | Metadata Type | Relevance | Weighted Score |
|---|---|---|---|
| #LebronJames | Video Metadata | High | 10 |
| #3-Pointers | User Provided Textual Description | Medium | 7 |
| #HotDogs | Audio Metadata | Low | 3 |
| #Boating | Video Metadata | Low | 1 |

FIG. 5

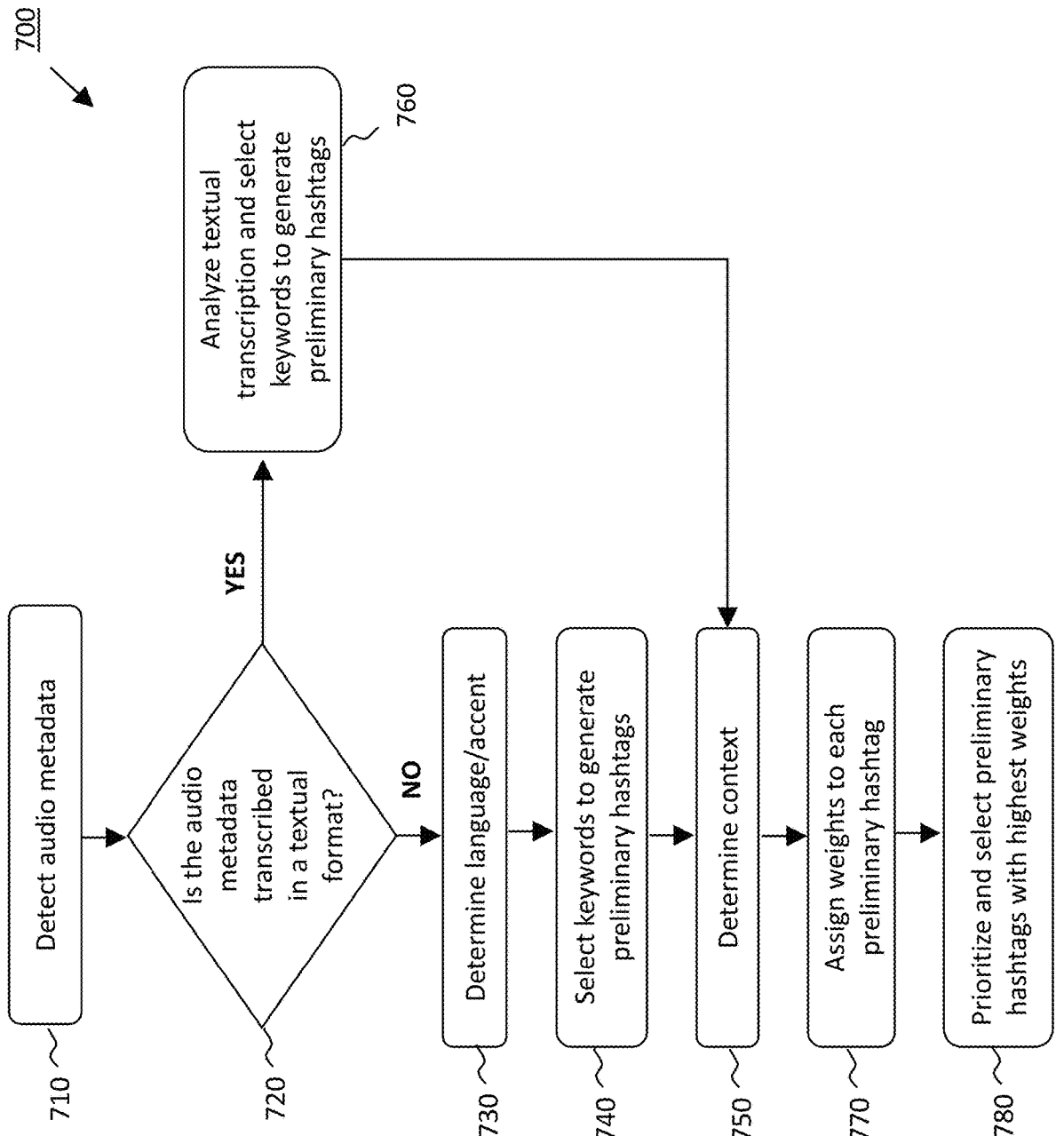

700

710 — Detect audio metadata

720 — Is the audio metadata transcribed in a textual format?

YES

760 — Analyze textual transcription and select keywords to generate preliminary hashtags

NO

730 — Determine language/accent

740 — Select keywords to generate preliminary hashtags

750 — Determine context

770 — Assign weights to each preliminary hashtag

780 — Prioritize and select preliminary hashtags with highest weights

FIG. 7

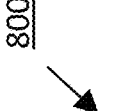
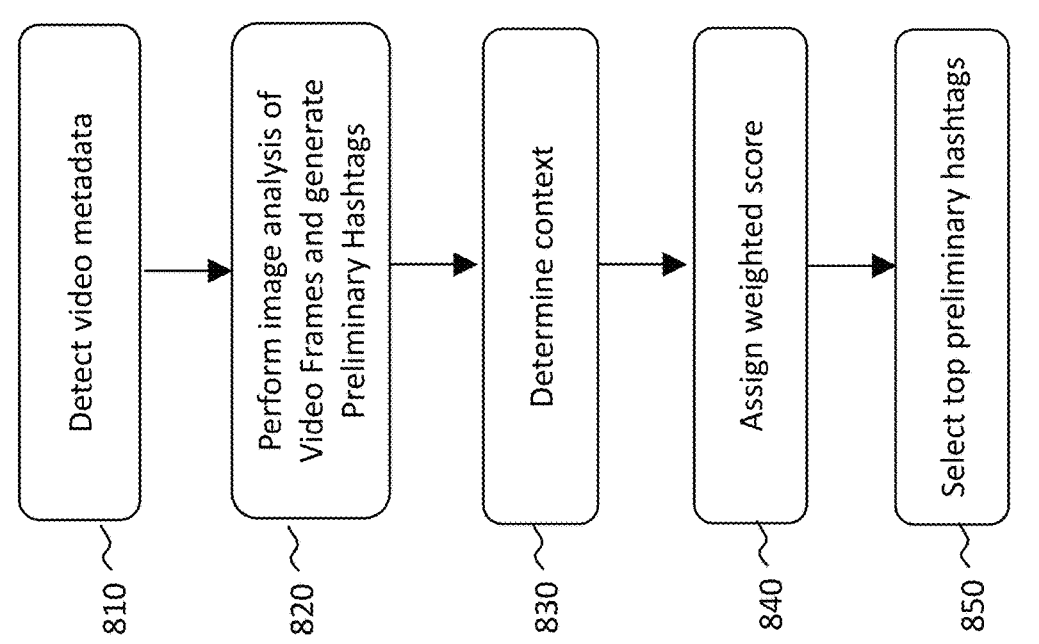
800
| Detect video metadata | 810 |
Perform image analysis of Video Frames and generate Preliminary Hashtags — 820
Determine context — 830
Assign weighted score — 840
Select top preliminary hashtags — 850
FIG. 8

We are waiting to take the tour today. We were not sure if we were going to come today but decided last minute. As you can see in the background, there is a big line behind us. We needed to get here earlier to beat the rush but we went to Aunt Mary's place and then grabbed a sandwich before we got here. It costs 16.70 Euros to take the elevator to the top, unless you have a coupon.
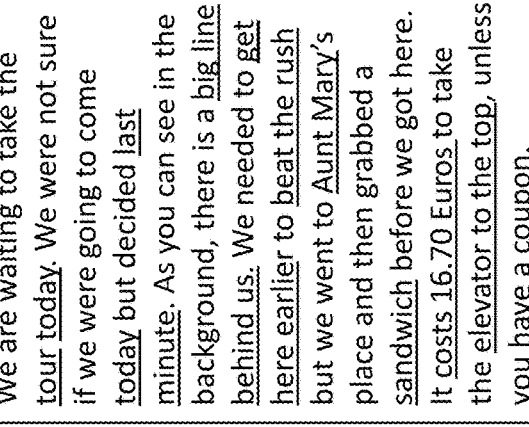
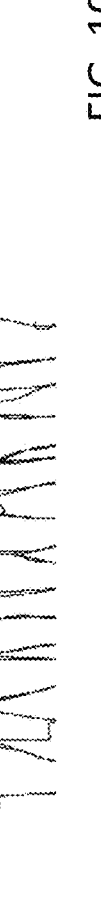
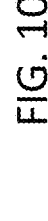
FIG. 10

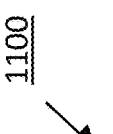
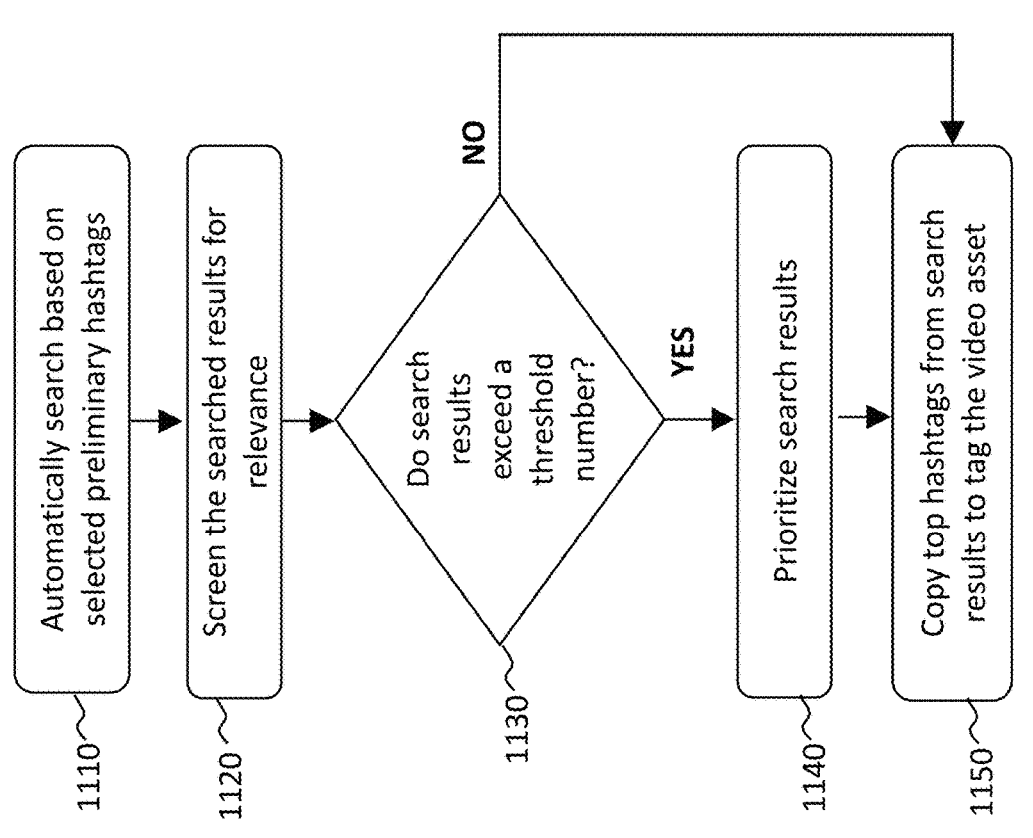
1100
1110   Automatically search based on selected preliminary hashtags
1120   Screen the searched results for relevance
1130   Do search results exceed a threshold number?
NO
YES
1140   Prioritize search results
1150   Copy top hashtags from search results to tag the video asset
FIG. 11

1200

1210
Influencers

1220
Trending
Hashtags

1230
Common
Hashtags

1240
Promotion-Based
Hashtags

1250
Hashtags with
High Click Rates

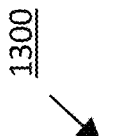
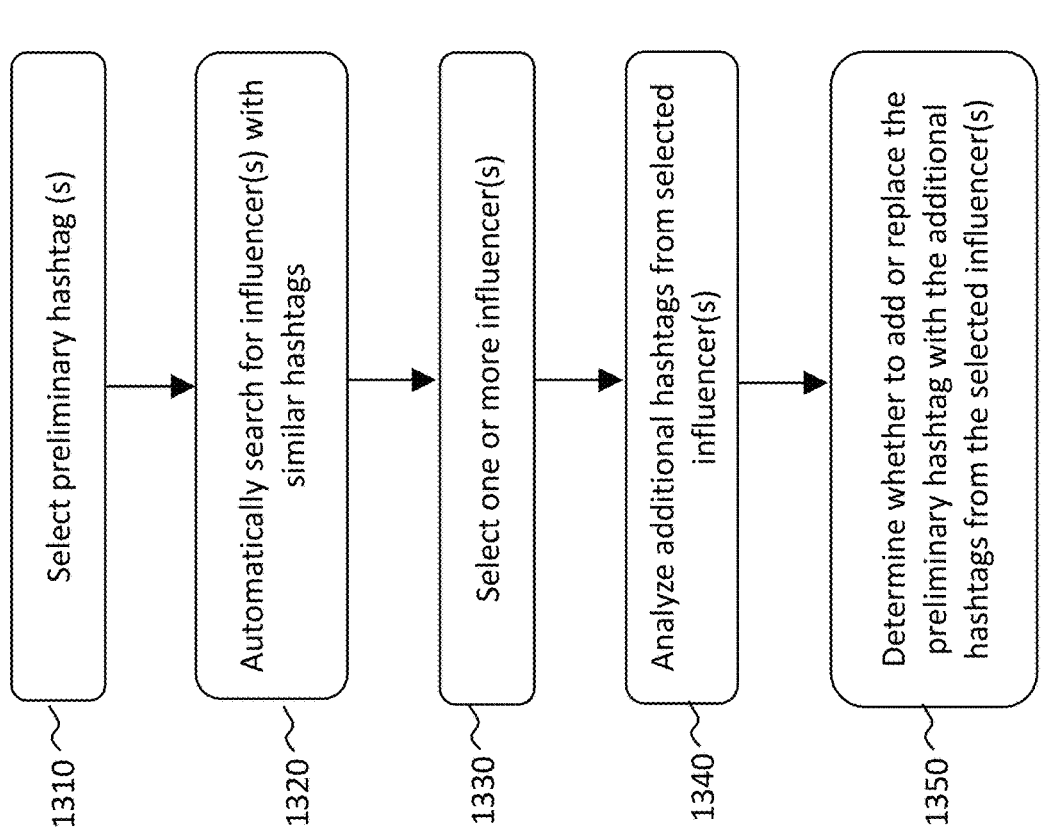
1300
1310 Select preliminary hashtag (s)
1320 Automatically search for influencer(s) with similar hashtags
1330 Select one or more influencer(s)
1340 Analyze additional hashtags from selected influencer(s)
1350 Determine whether to add or replace the preliminary hashtag with the additional hashtags from the selected influencer(s)
FIG. 13

SYSTEMS AND METHODS TO INCREASE VIEWERSHIP OF ONLINE CONTENT

FIELD OF INVENTION

Embodiments of the present disclosure relate to automatically generating hashtag(s) for a video asset uploaded to an online platform and refining the generated hashtag based on a sampling of related videos on the online platform.

BACKGROUND

Hashtag is a word, phrase, or combination of words and symbols that are preceded by a hash sign (#), also referred to as a pound mark. They are commonly used for tagging content that is uploaded on the Internet. For example, they are used in social media applications, websites, and video-sharing applications.

Hashtags serve as a quick search mechanism that allows a user to enter a hash phrase, such as "#NBAFinals," that results in quickly accessing online content that has been tagged with the hashtag "#NBAFinals." In the absence of hashtags, search results for a user entering the phrase "NBA Finals" would likely be a website that includes content relating to "NBA Finals." The search result may also direct the user to a list of videos that may relate to "NBA Finals." Instead of having the user navigate through the search results, input of a hashtag takes the user directly to content that has been specifically tagged with the hashtag, thereby making it easy to find related content.

Since search is sensitive to the words used in the hashtags, the phraseology of the hashtag is important and drives the search and discovery of the associated content. As such, in the current competitive landscape, where it is a challenge to drive traffic to your content, selecting a hashtag that accurately describes the associated content, is relevant to the topic of the associated content, or contains words and phrases that are likely to be searched, become even more important. A creatively generated hashtag can drive traffic to the content, thereby increasing your brand awareness while a less catchy or less searched hashtag will result in less traffic and less brand awareness.

A problem with current methods is that the viewership of the content is driven more by the ability to generate a creative and searchable hashtag rather than the quality of the content associated with the hashtag. Since the content generators who upload the content may not be aware of the mechanisms of adding the right hashtags to promote their content, they are at a disadvantage with marketers who are better in generating creative hashtags.

Put another way, a problem with the current methods is that creative hashtags or hashtags with promotions gain higher viewership irrespective of quality of content associated the hashtag. Viewers that are driven by the hashtag may ultimately be disappointed, since the content is not reflective of the hashtag. Thus, content that is high in quality is not treated as an equal citizen with content that is lower quality but has a better hashtag.

As such, there is a need for a mechanism to enable automated hashtags or identifiers for video content where the hashtags are reflective of the associated content, the topics of the content, and the relevance of the hashtag to the content that results in enabling auto promotion and making the content an equal citizen with other related content.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 1 is a block diagram of an exemplary system for generating and sampling hashtags, in accordance with some embodiments of the disclosure;

FIG. 4 is flowchart of a process for performing content analysis using the metadata associated with the video asset, in accordance with some embodiments of the disclosure;

FIG. 5 is an exemplary table for scoring preliminary hashtags, in accordance with some embodiments of the disclosure;

FIG. 7 is a flowchart of a process for performing content analysis using audio metadata of the video asset, in accordance with some embodiments of the disclosure;

FIG. 8 is a flowchart of a process for performing content analysis using video metadata of the video asset, in accordance with some embodiments of the disclosure;

FIGS. 9 and 10 are examples of generating and scoring preliminary hashtags, in accordance with some embodiments of the disclosure;

FIG. 11 is a flowchart of a process for sampling the preliminary hashtag, in accordance with some embodiments of the disclosure;

FIG. 13 is a flowchart of a process for selecting an influencer for sampling the preliminary hashtag, in accordance with some embodiments of the disclosure.

DETAILED DESCRIPTION

Figure 2:
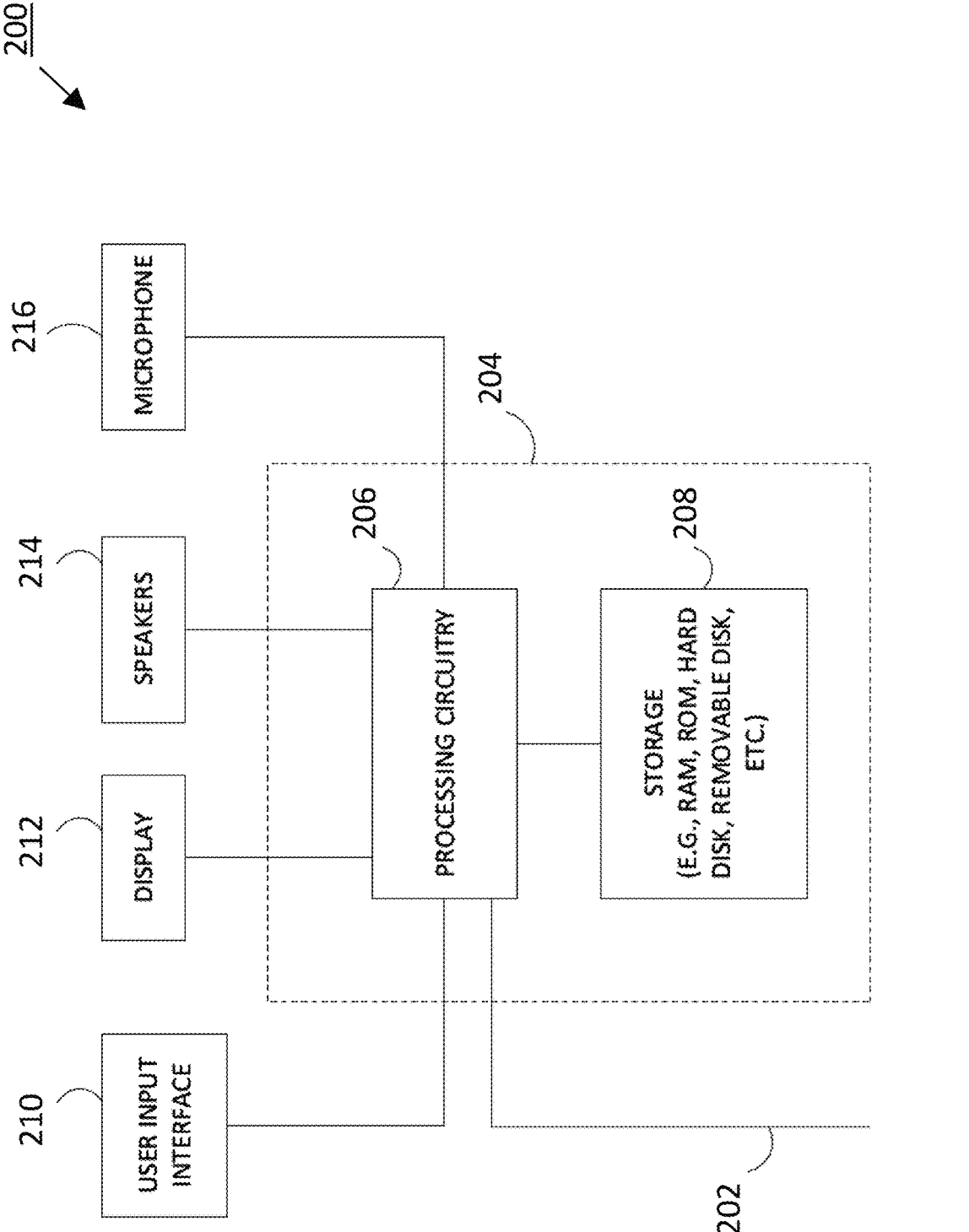
FIG. 2 is a block diagram of a generalized media device, in accordance with some embodiments of the disclosure.

In accordance with some embodiments disclosed herein, the above-mentioned limitations are overcome by automatically generating a preliminary hashtag(s) for a media asset, such a video asset, that is uploaded to an online platform. The preliminary hashtag is generated based on content analysis of the metadata associated with the video asset. The preliminary hashtag is sampled and tested with other related videos on the online platform and refined based on the sampling, thereby resulting in a refined final hashtag that is representative of the content of the video asset and enhanced to likely generate a higher level of viewership.

In some embodiments, the systems, using the disclosed methods, detect the uploading of a media asset, such as a video asset, to an online platform. Metadata associated with the video asset is also uploaded to the online platform. In some instances, the metadata is automatically generated by the online platform.

Metadata is analyzed to generate a set of preliminary hashtags. If multiple forms of metadata exist, such as audio metadata, video metadata, user-provided metadata, and/or system-generated metadata, then all forms of metadata are analyzed. The results of the metadata analysis are used to generate a set of preliminary hashtags. The results of the metadata analysis are also used to construct the context of the video asset.

If the number of preliminary hashtags generated is within a threshold number, then all the generated preliminary hashtags are used for sampling (which is a method of testing the effectiveness of the preliminary hashtag generated based on other related media assets on the online platform). If the number of preliminary hashtags generated is not within a threshold number, then the set of preliminary hashtags generated are compared to the context and evaluated for their relevance. A relevance score is given to each preliminary hashtag, and the relevance scores may be further prioritized based on weighted scores.

Once preliminary hashtags are generated, all or some of the preliminary hashtags are selected and sampled against other related media assets, such as video assets. The sampling process is used for determining the effectiveness of the preliminary hashtags, and it includes searching for related videos that include the same hashtag as the preliminary hashtag. The search may be focused based on various parameters, such as trending hashtags, hashtags posted by influencers, or hashtags that are associated with video assets that have high click rates. When using an influencer as a search focus parameter, the system automatically selects an influencer that is in the field of the uploaded video asset and searches analyses hashtags used by the influencer on a related video asset.

Once a plurality of related videos with the same hashtag as the preliminary hashtag are identified, an evaluation is made whether to adopt additional hashtags that are used by the influencer on the related video and not used on the uploaded video asset. The analysis includes determining relevance of the hashtags from the related videos.

If the number of hashtags from related videos that may be used for tagging the video asset exceeds a predetermined threshold, then an analysis is performed to score the hashtags from related videos. Although having a large number of hashtags helps the content to be found in more search results, having too many hashtags is not effective, because then the video is not focused and may show up in search results that are not as relevant. Thus, it is desirable to have an optimal number of hashtags that are focused and adequate to drive viewership.

Thus, when the number of hashtags resulting from the sampling search exceeds the threshold number, the hashtags are scored based on the relevance of the hashtag to the context generated by the system during the metadata analysis. The hashtags are then prioritized based on their score, and the top-scored hashtags within the predetermined threshold are selected to tag the video asset.

The outcome of the sampling process may result in replacing or removing the preliminary hashtag, retaining the preliminary hashtag, or adopting additional hashtags from the related video to tag the video asset. The hashtags are updated on a periodic basis to keep them current.

Prior to tagging the sampled hashtag to the video asset, a determination is made whether the hashtag complies with the platform policy. If a hashtag does not conform to platform policy or contains inappropriate language, it is discarded and not used. If the hashtag conforms to the platform policy, then the hashtag is published by tagging the video asset.

If the hashtag is a new hashtag that was not a preliminary hashtag or not tagged to the video previously, then the system may ask the user to approve the hashtag before it can be used to tag the uploaded video. Upon user approval, the video is tagged with the new hashtag. If the hashtag is not a new hashtag, i.e., it is either a preliminary hashtag or a previously used hashtag and the system is updating the hashtag to keep it current, such as by updating the year or the occasion, then a user approval may not be required, and the system may automatically update the hashtag and tag the uploaded video with the updated hashtag.

FIGS. 1-2 describe exemplary devices, systems, servers, and related hardware for generating preliminary hashtags, sampling the preliminary hashtags with related video assets and, tagging video assets with the sampled hashtags, in accordance with one embodiment. In the system 100, there can be more than one user equipment device 102 but only one is shown in FIG. 1 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 106.

The user equipment devices may be coupled to communications network 106. Namely, the user equipment device 102 is coupled to the communications network 106 via communications path 104. The communications network 106 may be one or more networks including the Internet, a mobile phone network, mobile voice or data network (e.g., a 4G, 5G, or LTE network), cable network, public switched telephone network, or other types of communications network or combinations of communications networks. The path 104 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 104 can be a wireless path. Communication with the user equipment device may be provided by one or more communications paths but is shown as a single path in FIG. 1 to avoid overcomplicating the drawing.

The system 100 also includes media asset sources, such as video asset sources 112, and server 114, which can be coupled to any number of databases providing information to the user equipment devices. The information sources 112 represent any computer-accessible sources, such as servers, databases, platforms (such as video sharing platforms) that store media assets, such as video assets. The server 114 may store and execute various software modules for generating and sampling hashtags. In some embodiments, the user equipment device 102, video asset sources 112, and server 114 may store metadata associated with video assets.

FIG. 2 shows a generalized embodiment of a user equipment device 200, in accordance with one embodiment. In an embodiment, the user equipment device 200, is the same user equipment device 102 of FIG. 1. The user equipment device 200 may receive content and data via input/output (I/O) path 202. The I/O path 202 may provide audio content (e.g., broadcast programming, on-demand programming, Internet content, content available over a local area network (LAN) or wide area network (WAN), and/or other content) and data to control circuitry 204, which includes processing circuitry 206 and a storage 208. The control circuitry 204 may be used to send and receive commands, requests, and other suitable data using the I/O path 202. The I/O path 202 may connect the control circuitry 204 (and specifically the processing circuitry 206) to one or more communications paths. I/O functions may be provided by one or more of these communications paths but are shown as a single path in FIG. 2 to avoid overcomplicating the drawing.

The control circuitry 204 may be based on any suitable processing circuitry such as the processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The generating and sampling of hashtags and related functions and processes as described herein can be at least partially implemented using the control circuitry 204. The generating and sampling of hashtags and related functions and processes as described herein may be implemented in or supported by any suitable software, hardware, or combination thereof. The generating and sampling of hashtags and related functions and processes can be implemented on user equipment, on remote servers, or across both.

In client-server-based embodiments, the control circuitry 204 may include communications circuitry suitable for communicating with one or more servers that may at least implement the storing of the video assets and generating and sampling of hashtags and related functions and processes as described herein. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 208 that is part of the control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 208 may be used to store various types of content described herein, such as preliminary hashtags, final hashtags, video assets, and metadata associated with the video asset. Nonvolatile memory may also be used (e.g., to launch a boot-up routine and other instructions). Cloud-based storage, described in relation to FIG. 1, may be used to supplement the storage 208 or instead of the storage 208.

The control circuitry 204 may include audio generating circuitry and tuning circuitry, such as one or more analog tuners, audio generation circuitry, filters or any other suitable tuning or audio circuits or combinations of such circuits. The control circuitry 204 may also include scaler circuitry for upconverting and down converting content into the preferred output format of the user equipment device 200. The control circuitry 204 may also include digital-to-analog converter circuitry and analog-to-digital converter circuitry for converting between digital and analog signals. The tuning and encoding circuitry may be used by the user equipment device 200 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 208 is provided as a separate device from the user equipment device 200, the tuning and encoding circuitry (including multiple tuners) may be associated with the storage 208.

The user may utter instructions to the control circuitry 204, which are received by the microphone 216. The microphone 216 may be any microphone (or microphones) capable of detecting human speech. The microphone 216 is connected to the processing circuitry 206 to transmit detected voice commands and other speech thereto for processing. In some embodiments, voice assistants (e.g., Siri, Alexa, Google Home and similar such voice assistants) receive and process the voice commands and other speech.

The user equipment device 200 may optionally include an interface 210. The interface 210 may be any suitable user interface, such as a remote control, mouse, trackball, keypad, keyboard, touch screen, touchpad, stylus input, joystick, or other user input interfaces. A display 212 may be provided as a stand-alone device or integrated with other elements of the user equipment device 200. For example, the display 212 may be a touchscreen or touch-sensitive display. In such circumstances, the interface 210 may be integrated with or combined with the microphone 216. When the interface 210 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 210 may be HDTV-capable. In some embodiments, the display 212 may be a 3D display. The speaker (or speakers) 214 may be provided as integrated with other elements of user equipment device 200 or may be a stand-alone unit. In some embodiments, the display 212 may be outputted through speaker 214.

The user equipment device 200 of FIG. 2 can be implemented in system 100 of FIG. 1 as user equipment device 102, but any other type of user equipment suitable for generating and sampling of hashtags and related functions and processes as described herein may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 3:
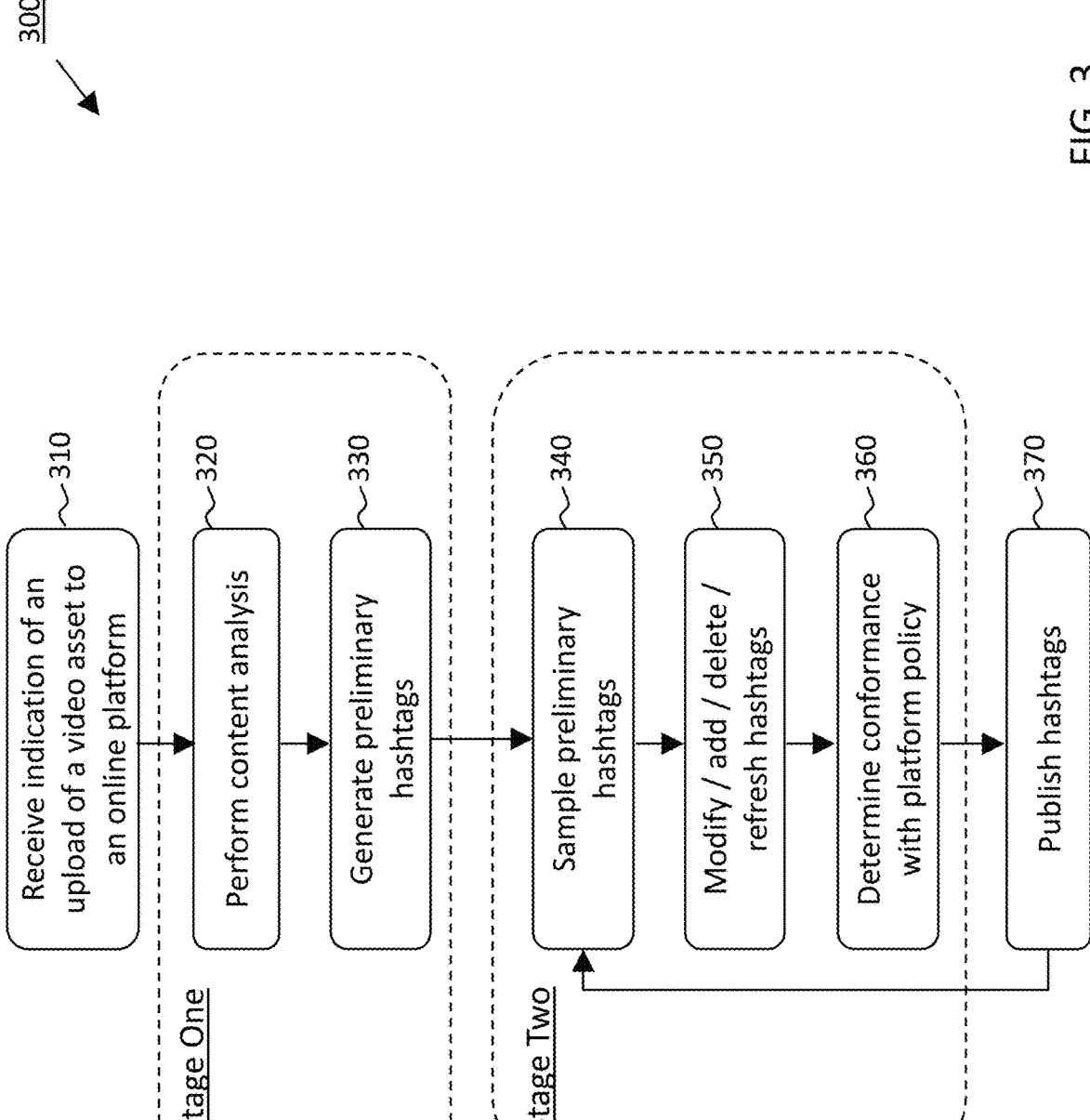
FIG. 3 is flowchart of a process for automatically generating and sampling a hashtag for a video asset uploaded on an online platform, in accordance with some embodiments of the disclosure.

FIG. 3 is flowchart of a process 300 for automatically generating and sampling a hashtag for a media asset, such as a video asset, uploaded on an online platform, in accordance with some embodiments of the disclosure. The media asset, such as a video asset, can range from user video taken from a mobile phone to a movie, episode, documentary, to an animation, etc. Although the phrase, video asset, is used for convenience, a full range of media assets are contemplated by the embodiments.

Process 300 allows content of the video asset to be normalized across the online platform such that quality of content drives the viewership of the video asset rather than the viewership being driven by the video asset having an attractive hashtag, especially when the attractive hashtag is not reflective of the content within the video asset.

The process begins at step 310, where the system detects uploading of the video asset to an online platform. This may be through the system receiving an indication of the upload. The online platform can be a social media platform (such as Facebook, Instagram, Twitter, SnapChat, WhatsApp Groups) or any platform on the Internet that allows uploading of a video asset, such as YouTube or video sharing platforms such as TikTok. Facebook is a trademark owned by Facebook, Inc., SnapChat is a trademark owned by Snap, Inc., Instagram is a trademark owned by Instagram, LLC, Twitter is a trademark owned by Twitter, Inc., YouTube is a trademark owned by Google Inc, and TikTok is a trademark owned by ByteDance Ltd.

In one embodiment, the process 300 comprises the user authorizing the system 100 to access and monitor the user's online activity. Thus, when the user uploads a video asset to an Internet platform, the system recognizes the upload and automatically starts process 300.

When a user uploads the video asset, the user may also upload metadata that is associated with the video asset. The metadata may be uploaded as part of the video asset or uploaded separately and associated with the video asset. In some embodiments, the platform on which the video asset is uploaded may have its own metadata checklists or templates that need to be filled by the user. For example, the platform may require the user to enter the title, description, genre, and other identifying information, such as categories and keywords, that describe the uploaded video asset. In other embodiments, the system may generate its own metadata for the uploaded asset.

Upon detecting the uploading of the video asset to the online platform, at block 320, the system automatically performs content analysis of the uploaded video asset. Content analysis includes analyzing all metadata associated with the video asset. Details relating to the content analysis process are described in the discussion of FIG. 4.

In one embodiment, there are several different categories of metadata associated with the video asset. The system analyzes each category of metadata, separately or in parallel. Some of the metadata categories analyzed by the system are described in the discussion of FIG. 6. As shown, these categories include audio 610, video 620, user-given hashtags 630, genre 640, user-provided metadata 650, system-generated metadata 660, closed caption 670, and promotional content 680.

Each metadata category is analyzed, and relevant keywords and repeated words are extracted from the metadata. For example, keywords such as "recipe," "cake flour," "gluten free," may be extracted from a video asset that depicts a person baking a cake.

At block 330, preliminary hashtags are generated. In one embodiment, preliminary hashtags are generated for all the relevant keywords extracted from the metadata analysis. In another embodiment, selective keywords extracted are used for generating the preliminary hashtags. In yet another embodiment, an artificial intelligence (AI) algorithm is used to extract keywords that meet a certain relevancy threshold, and the extracted keywords are used to generate preliminary hashtags. Additional details relating to the extracting keywords through metadata analysis to generate preliminary hashtags are described in the discussion of FIG. 4.

In addition, the keywords extracted by performing content analysis at block 320, are also utilized to construct the context of the video asset. For example, based on the keywords, recipe, cake flour, gluten free, an AI algorithm may be used to construct the context of the video, which in this case could be a person baking a gluten-free cake and are sharing their recipe on how to bake the cake. Other methods, outside of AI algorithm, may also be used to construct the context of the video asset.

In one embodiment, each preliminary hashtag is analyzed with respect to the context constructed. The preliminary hashtag may be given a weighted score based on the contextual analysis. The weighted score represents the relevancy and closeness of the preliminary hashtag to the context of the video. The generated preliminary hashtags may then be prioritized based on their weighted score, and, in one embodiment, the top preliminary hashtags may be selected for sampling. Alternatively, if the number of preliminary hashtags generated is within a predetermined threshold number of hashtags, then all the preliminary hashtags may be used for sampling. The predetermined threshold is used to prevent too many preliminary hashtags from being created.

Referring back to block 320, if the metadata is audio, then the system may use speech recognition software to analyze the audio metadata to extract keywords, and repeated words, or to transcribe the audio portions of the video asset to construct a model that can be used to analyze context, language, and accent. The keywords extracted are contextually analyzed and weighted to generate preliminary hashtags. Additional details relating to content analysis of the audio component are described in the discussion of FIG. 6.

Referring back to block 320, if the metadata is video, the system performs content analysis on the video component of the metadata. In one embodiment, the system may use image or video frame analysis software to analyze the video frames to construct a model that can be used to analyze context, actions, and images included in the video asset. Additional details relating to content analysis of the video component are described in the discussion of FIG. 8.

At block 330, one or more preliminary hashtags are determined based on the results of the content analysis performed. The preliminary hashtags are reflective of the content within the video asset. For example, in one embodiment, a preliminary hashtag may describe the main topic of the video asset, and in another embodiment, the preliminary hashtag may describe a secondary topic of the video asset.

Blocks 320 and 330 are associated with Stage One processing to obtain a preliminary hashtag. Stage One processing, as described in these blocks, is used to analyze the metadata associated with the uploaded video asset and automatically generate preliminary hashtags that are reflective of the content within the video asset.

Once the preliminary hashtags are generated, they are sampled and tested in Stage Two to determine their effectiveness. In one embodiment, if the number of preliminary hashtags generated exceeds a threshold number, then the preliminary hashtags are scored based on their relevance to the context of the video asset, prioritized based on the scoring (weighted scoring), and then a number of preliminary hashtags, within the threshold number, with the highest weighted scores are selected for sampling.

At block 340, the preliminary hashtags may be sampled from a set of related videos on the platform where the video asset was uploaded. They may be sampled based on trending hashtags, hashtags posted by influencers, or hashtags that have high views. Additional details relating to the sampling process are described in the discussion of FIG. 11 and exemplary categories of sampling are described in the discussion of FIG. 12.

Based on the sampling results, the preliminary hashtag may be retained or replaced, or additional hashtags maybe be used to tag the video asset. Retaining the preliminary hashtag converts the preliminary hashtag into a final hashtag that is used to tag the video asset. Retaining the hashtag is also an indicator that, based on the sampling analysis, the preliminary hashtag is effective and should be retained. Likewise, replacing or deleting the preliminary hashtag is an indicator that the preliminary hashtag is not effective and may not generate as many views and traffic as some of the other hashtags and, thus, should be deleted or replaced.

Adding a hashtag comprises copying trending hashtags, hashtags posted by influencers, or hashtags that have high views that are tagged on related videos but not generated as a preliminary hashtag during the content analysis. Since a determination is made that adding the hashtag would increase the reach and effectiveness of the video asset, thereby likely gaining more visibility on the platform, the additional hashtags are used to tag the video asset.

In another embodiment, once a hashtag is used to tag the video asset, regardless of whether it is a preliminary hashtag retained to make it a final hashtag, a replacement hashtag or an additional hashtag, the hashtag is automatically refreshed or updated to keep it current. The refreshed update, for example, could be updating a year or an occasion that is current, e.g., "#2007Halloween" may be updated to "#2021Haloween". Additional details of sampling, adding, and refreshing hashtags are described in FIGS. 8-10.

If a determination is made at block 350 to either add, modify, replace, or refresh the hashtag, then at block 360, a determination is made to ensure that the hashtag conforms to the rules and regulations set forth by the platform. Thus, the system may automatically check the hashtag against the platform policy that provides rules and regulations for posting on the platform.

The automatic check may include performing a sentiment analysis of the hashtag and determining if the results of the analysis comport with the platform policy. Sentiment analysis may be performed on text, video, or other parameters. In one embodiment, an artificial intelligence or machine learning algorithm may be used to perform a visual sentiment analysis to detect emotion, violence, happy and sad faces, different moods etc. The algorithms may also be trained over time after having been applied to various video assets to recognize sentiment quickly and accurately.

Sentiment analysis may also be based on text where to determine a positive or negative sentiment. For example, if a written description or a product review negative or positive. In addition to text and video sentimental analysis, additional categories on which sentimental analysis can be performed are also contemplated, for example, audio sentimental analysis can also be performed to analyze the tone used while a person is speaking, or acoustic features of a speech, to determine the mood, emotion, or attitude of a person towards a product or a topic.

The automatic check may also include checking keywords from the hashtag to determine if the keywords are flagged by the platform policy for posting.

At block 370, if the hashtags conform to the platform policy, the sampled hashtags may be published on the platform on which the video asset was uploaded. Specifically, the video asset may be tagged with the newly added, modified, or refreshed hashtags.

FIG. 4 describes a process for performing content analysis based on the metadata of the video asset, in accordance with some embodiments. Process 400 determines the components of metadata available for content analysis. These components, or categories, are described in the discussion of FIG. 6. For example, these categories include audio 610, video 620, user-given hashtags 630, genre 640, user-provided metadata 650, system-generated metadata 660, closed caption 670, and promotional content 680.

At block 410, metadata is analyzed. Metadata analysis is used for generating preliminary hashtags and context of the video asset. As mentioned earlier, metadata can be of different types, and process 400 may be tweaked for different types of metadata as needed. For example, FIGS. 7 and 8 further detail process 400 as applied to audio and video categories.

At block 420, relevant keywords are obtained through the metadata analysis. In one example, repeated words are extracted from the video asset and examined for their relevance. In another embodiment, an algorithm suitable for the metadata type may be used to obtain relevant keywords. The algorithm may vary depending on the type of metadata to be analyzed; for example, a speech recognition algorithm may be used when performing an audio metadata analysis and an image recognition algorithm may be used when performing a video-frame or image metadata analysis. The algorithm may examine all the actions, images, words, and other metadata to determine what is and what is not a relevant keyword. It may be trained to overlook keywords that are not relevant to the video asset.

For example, while performing an audio metadata analysis, the algorithm determines that the following sentence was uttered in the video asset: "Today we were bored and just hanging out and we decided to be creative and bake a three-layer tres leches cake." The algorithm would analyze the audio metadata and determine that several words in the sentence are provided for grammatical construction of the sentence and are not core to the concept of the uttered sentence. It may also pick up the words/phrases "bored," "hanging out," "decided," and "today" as not being relevant and pick the keywords "thee-layer," "cake," "tres leches," "bake," and possibly "creative" to be relevant. As such, the algorithm may pick up certain words that it deems relevant, and it may be trained over time to enhance its detection of relevant keywords. Certain keywords may also be preprogrammed into the algorithm as relevant keywords. Although certain keywords were deemed relevant and picked, the embodiment are not so limited and other keywords may be deemed relevant or not relevant based on the algorithm.

Regardless of the approach, once relevant keywords are selected, at block 420, the system 100 generates preliminary hashtags based on the relevant words. In one embodiment, the preliminary hashtags are exact replicas of the relevant keywords and phrases extracted based on the metadata analysis. In another embodiment, the preliminary hashtags may be refined or cleaned-up forms of the relevant keywords extracted. For example, one such refinement may be to automatically fix any misspellings, typos, or grammatical mistakes in the relevant keyword prior to using the keyword as the preliminary hashtag.

At block 430, the keywords obtained through the metadata analysis are used for constructing the context of the video asset. Using the example above, if the audio metadata analysis reveals that the following sentence was uttered in the video asset: "Today we were bored and just hanging out and we decided to be creative and bake a three-layer tres leches cake. We will get the supplies from Whole Foods," then the algorithm may analyze the sentence and determine that the context is baking a three-layer tres leches cake. As such, in constructing the context, the algorithm may determine main topics and secondary or sub-topics. For example, a sub-topic may be what to do when you are bored and into baking, or baking creative cakes, or where to get your supplies for baking the cake, i.e., Whole Foods.

At block 440, based on the context, weights are assigned to each preliminary hashtag. For example, as shown in the table in the discussion of FIG. 5, if the algorithm determines that the context of the video is top NBA performers in the 2021 season, then the preliminary hashtags are evaluated based on the context and given appropriate relevancy and weighted scores. For exemplary purposes, let's assume that the context constructed shows two people discussing NBA players while watching an NBA game on their mobile phone during a boating trip and eating hot dogs.

As shown in the table in the discussion of FIG. 5, based on the context, the keyword "LeBron James" was extracted based on image analysis of the video asset. Since the topic is about top NBA performers, and LeBron James is one of the top performers, the algorithm gives the preliminary hashtag a high relevancy rating. Accordingly, a weighted score of 10 out of 10 is also given to the preliminary hashtag "#LebronJames."

As shown in the table in FIG. 5, a key phrase, "3-pointers," resulted in the generation of the preliminary hashtag "#3-pointers" based on metadata analysis of a description provided by the user that uploaded the video asset. Since 3-pointers are related to the game of basketball but of a lower relevance than naming the actual player, LeBron James, in the context of NBA performers, it is given a medium relevance rating. As such a weighted score of 7 out of 10 is given to the preliminary hashtag "#3-pointer."

As shown in the table in FIG. 5, an audio metadata analysis resulted in extracting a keyword, "hot dogs," from the video asset. As such, the keyword was used by the system to create a preliminary hashtag, "#Hotdogs." Although "hot dogs" was picked up as a relevant keyword, perhaps because the people shown in the video were eating hotdogs or uttered the word hot dogs, since it is not relevant to the topic of top NBA performers, it receives a low relevancy ranking and a weighted score of 3. Likewise, since the NBA top performers discussion was taking place on a boating trip, the video metadata picked up an image of the boat as the background during the NBA top performer discussion. A hashtag. "#boating," was generated based on the background image. Since boating is not relevant to the context of top NBA performers, it receives a low relevancy score and likewise a low weighted score.

Figure 9:
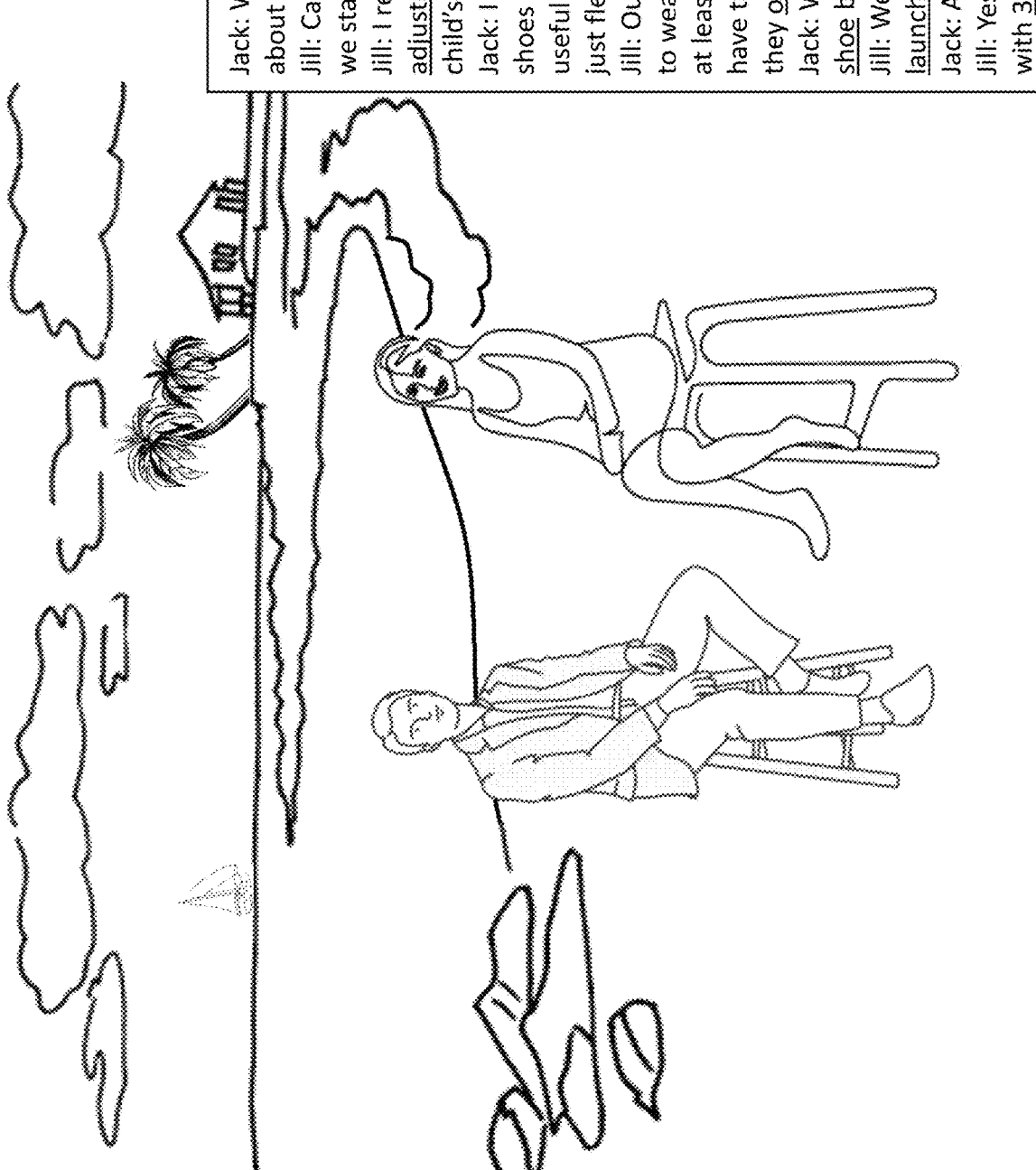

Additional examples of determining relevance of preliminary hashtags in light of the context are described in FIGS. 9 and 10. Although the table in FIG. 5 shows two types of scoring, i.e., relevancy rating/score and weighted score, either one or another can also be used instead of both relevancy and weighted scores to determine the hashtag priority/ranking such that hashtags with the highest priority can be selected when the number of preliminary hashtags exceeds the predetermined number of hashtags.

The scoring methodologies can also vary. For example, relevancy or weighted scoring may include ranges of 1-10, 1-100, low-medium-high scoring or other types of scoring as desired. Additional scoring ranges within a tier, such as a 1-10 or 1-100 weighted score, may be assigned for a high relevancy tier such that preliminary hashtags within high relevancy tier can be further prioritized.

Referring back to FIG. 4, at block 450, the preliminary hashtags are prioritized based on their weighted score. In one embodiment, the top preliminary hashtags may be selected for sampling. Alternatively, if the number of preliminary hashtags generated is within a predetermined threshold number of hashtags, then all the generated preliminary hashtags may be used for sampling.

Figure 6:
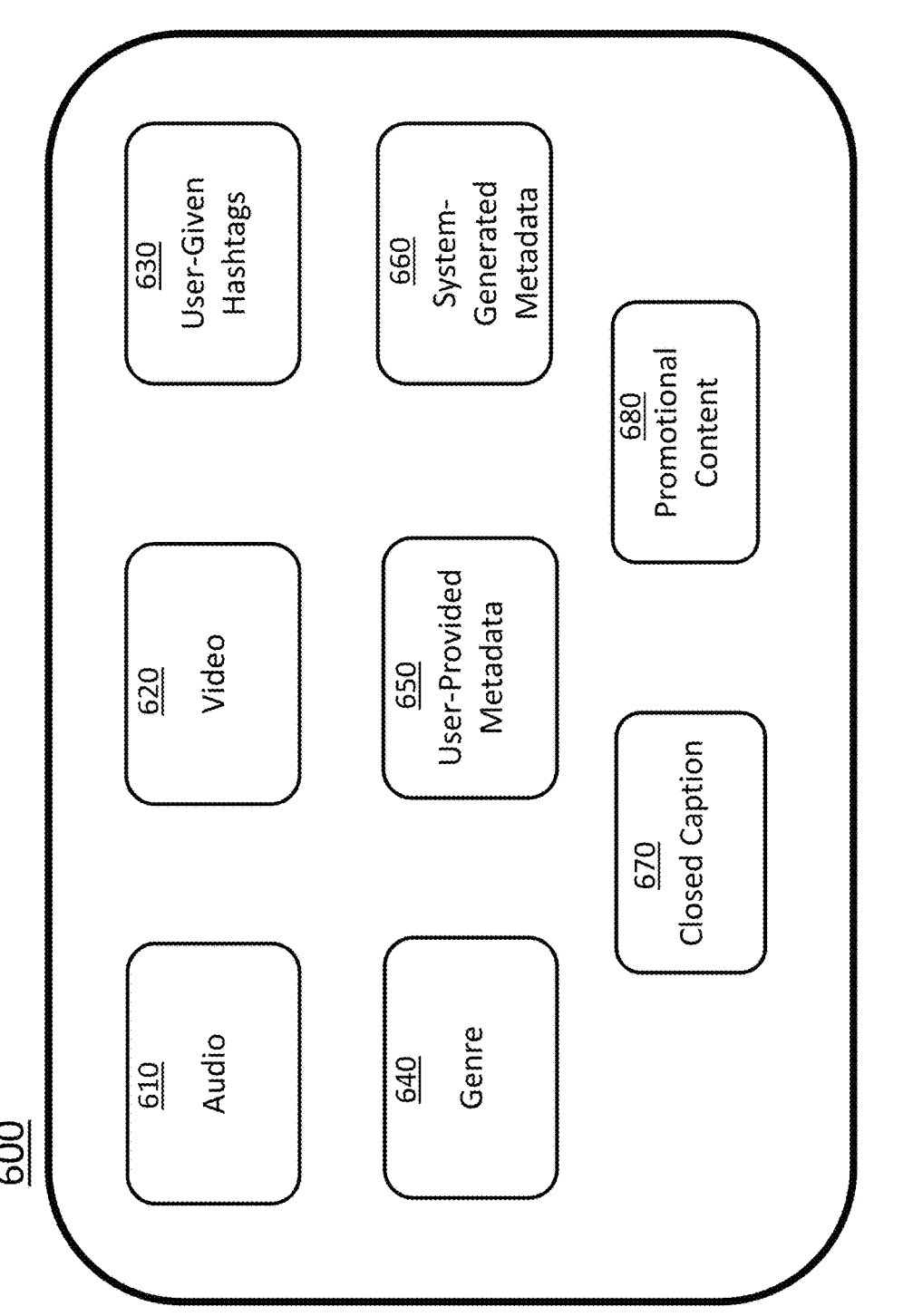
FIG. 6 is a block diagram of a plurality of metadata categories that may be used for content analysis, in accordance with some embodiments of the disclosure.

FIG. 6 is a block diagram of a plurality of metadata categories that may be used for content analysis, in accordance with some embodiments of the disclosure. As shown, these categories include audio 610, video 620, user-given hashtags 630, genre 640, user-provided metadata 650, system-generated metadata 660, closed caption 670, and promotional content 680. Although a few exemplary categories are depicted, the embodiments are not so limited, and additional categories are also contemplated.

The audio 610 category relates to spoken words or other sounds, such as music, traffic noise, and other audible sounds that are in the video asset. The audio metadata analysis, which is described below in the discussion of FIG. 7, involves analyzing audio metadata and using it to generate preliminary hashtags. It may use speech recognition and other suitable audio software to convert speech and sounds into relevant keywords.

The video 620 category relates images, video frames, and all actions and background in the video asset. The video metadata analysis, which is described below in the discussion of FIG. 8, involves using video or image analyzing software to analyze video metadata and using it to generate preliminary hashtags.

User-given hashtags 630 are hashtags that the user may have used to tag the video asset either when uploading the video asset or thereafter. The user-given hashtags are analyzed and used to generate preliminary hashtags.

Genre 640 can be for a variety of categories that include movies, artistic composition, music, sports, or any other form. It may also be a further categorization of a movie, such as comedy, horror, science fiction, action, suspense, family movie, animation, drama, romance, mystery, thriller, musical, same actor, same producer, and same motion picture company. Metadata analysis of genre may be performed to generate genre-appropriate preliminary hashtags. For example, the genre may be the name of an actor, an action performed in the video asset, a certain producer, etc. Preliminary hashtags such as "#BruceWillis," "#Bowling," and "#CookingShow" are examples of genre-related hashtags.

User-provided metadata 650 includes descriptions, titles, or any other metadata provided by the user either when uploading the video asset or thereafter. The user-given metadata is analyzed and used to generate preliminary hashtags.

System-generated metadata 660 includes automated metadata generated by the platform. For example, some platforms auto-fill a template when a video asset is uploaded or include mechanisms to categorize the video asset and generate metadata that is related to the video asset, such as category, genre, title, description, etc. The system-generated metadata is analyzed and used to generate preliminary hashtags.

Closed caption 670 relates to a transcription of the audio portion of the video asset that may be generated by the platform on which the video asset is uploaded. The text transcribed by the closed caption mechanism is analyzed and used to generate preliminary hashtags.

Promotional content 680 relates to promotions such as a discount, sale, or coupon code that is included in the video asset. Promotional content also relates to video assets that are paid promotions for selling a certain product or service. The promotional content is generally attractive to their related audience as it can be a driving force to gain viewership. In some cases, the related audience may be interested in and search for promotions in their area of interest. Thus, promotional metadata is analyzed and used to generate preliminary hashtags.

As described in the discussion of FIG. 4, the system analyzes all the metadata categories that are associated with the video. If the video asset contains more than one metadata category, such as audio, video, and genre, then all three categories of metadata are analyzed to generate preliminary hashtags, and the hashtags are weighted and prioritized for sampling.

In another embodiment, if the video asset contains more than one metadata category, the system may determine that analyzing one or more categories is sufficient and it does not need to analyze all the metadata categories that are associated with the video. For example, if analysis of one category provides metadata that can be used to create preliminary hashtags that are representative of the content within the video asset, the system may determine that such analysis is sufficient, and it does not need to analyze other categories of metadata.

The system may determine on a case-by-case basis whether analysis of one category, two categories, or some n number of categories that are less than all the categories is sufficient to generate the quality and quantity of preliminary hashtags needed. For example, if closed captioning is available as a metadata category, and the closed caption transcribes the key portions of the video asset content that can be used to generate the preliminary hashtags, then the system may determine that the preliminary hashtags generated based on the closed captioning capture the essence of the video asset and are sufficient to sample the video asset with related videos on the platform, and, thus conclude the metadata analysis such that other categories are not analyzed. However, it the system determines that the closed captioning does not contain sufficient information, thereby resulting in preliminary hashtags that are not adequate to represent the video asset, then the system may continue analyzing another category, such as video, which are actions that may not be captured by the closed captioning which relates more to audio rather that non-audible video.

In one embodiment, the system may determine the source of the video, platform, or channel on which the video asset was uploaded. The system may be programmed to limit the metadata analysis to certain categories, or not perform a metadata analysis at all if the source is approved or verified by the system. In one embodiment, a verified channel may be a channel which generate its own metadata that the system can rely on for generating preliminary hashtags. In another embodiment, the system may recognize that it can rely on a category of metadata from the system, such as audio, based the channel's ability/expertise to perform the audio analysis, but not its video analysis. As such, the system may forego performing its own audio metadata analysis, thereby obtaining the audio analysis metadata analysis results from the channel, and perform its own the video metadata analysis.

In another embodiment, if the video asset contains more than one metadata category, the system may prioritize which metadata category to analyze and depending on the outcome of the analysis, may determine whether to analyze more metadata categories based on the determined priority.

FIG. 7 is a flowchart of a process 700 for performing content analysis using audio metadata of the video asset, in accordance with some embodiments of the disclosure. Audio metadata includes spoken words and sounds, such as music, traffic noise, and other audible sounds that are in the video asset.

At block 710, the system automatically detects audio metadata from an uploaded video asset. Various types of audio detection mechanisms may be used to detect and identify acoustic sounds. The mechanism may listen for sounds and characteristics of sound ranging from decibel level to the energy in different frequencies. The mechanisms, such as an artificial intelligence algorithm or other software, may be programmed to detect relevant audible sounds and ignore background noise like traffic, conversations, or music, unless they are the focus of the audio metadata. As such, sounds that are relevant may be extracted from the video asset, even when the video asset does not depict the source of the sound, e.g., a person talking when they are not in the frame of the video.

At block 720, a determination is made of whether the audio metadata is transcribed into textual format. In one embodiment, the audio metadata may be available in a closed-captioned format where the audio metadata is already transcribed into a textual format. For example, some platforms automatically transcribe the text through closed captioning when a video asset is uploaded.

In other embodiments, when the audio metadata is not transcribed into a textual format, various mechanisms may be utilized to do so. For example, at block 760, speech recognition software may also be used to detect and analyze speech. The process of detecting may include understanding speech and convert it into readable text, such as by performing analog-to-digital conversion, which translates the analog waves emitted by speech into digital data that is broken down into sound bites. The sound bites may then be matched to phonemes in the given language and compared with a dictionary or database of known words. Additional mechanisms to detect and convert speech may also be used.

Once the audio metadata is analyzed and keywords from the audio metadata are selected to generate preliminary hashtags, then, using the extracted keywords, the context of the video asset may be determined at block 750. Along with the context, the language and accent related to the audio metadata may also be determined.

Referring back to block 720, if the audio metadata has been transcribed into a textual format, then at block 730, the language and accent related to the audio metadata may be determined. In one embodiment, speech recognition software may be used to determine the language spoken in the video asset. For example, the speech recognition software may analyze the words spoken in the video asset and associate them with a language, such as English, French, Hindi, Arabic, Spanish, or some other language. The speech recognition software may also detect an accent of the language. The language and accent are used for determining which locale, region, or platform is to be used for placing and promoting the video asset. For example, if a determination is made that the language is Hindi, and the accent and the dialect of Hindi that is spoken in the video asset is common in Bangalore, a city in India, then the system would recommend that the hashtag be posted on a platform where Indian language and the specific accent and dialect is prevalent, or regionally in Bangalore, India where such accent of Hindi is used.

At block 740, relevant keywords and repeated words are extracted from the audio metadata. Keywords and repeated words are relevant as they are an indicator of the topics and subtopics used in the video asset. For example, if the audio metadata contains the word "cake" repeated multiple times throughout the video asset, then it is likely that a topic of the video asset relates to cake. If the keywords, such as "baking," "sugar," "icing" are used in the video asset, they may help construct a model to understand the context of the video asset which in this case may be baking a cake.

At block 750 based on the audio metadata analysis and the keywords obtained from such analysis, a context is constructed. A variety of parameters, such as keywords, repeated words, language and sentence structure, may be used to construct the context, which may be further subdivided into main topics and sub-topics.

At block 770, weighted scores are assigned to each preliminary hashtag based on the context. Preliminary hashtags that are closely related to the context will get a higher weighted score as compared to preliminary hashtags that are not as closely related. For example, a sports activity, such as a basketball game, where majority of the focus is on the video portion of the video asset, such as players running on the basketball court, dribbling, passing the ball, and scoring will receive a high weighted score. The audio portion, which involves two individuals sporadically speaking to each other during the game, which is marginally related to the basketball game, will receive a low weighted score, as opposed to a half-time show of commentators that provide an analysis of the basketball game, where the focus is on the spoken commentary and not so much at the background, which will receive a higher weighed score.

In one embodiment, if the number of preliminary hashtags generated exceeds a threshold number, then the preliminary hashtags are prioritized based on their weighted score, and preliminary hashtags with the highest weighted score are used for sampling. However, if the number of preliminary hashtags generated is within the threshold number, then all the generated preliminary hashtags are used for sampling.

FIG. 8 is a flowchart of a process for performing content analysis using video metadata of the video asset, in accordance with some embodiments of the disclosure.

In one embodiment, as described in FIG. 8, process 800 is used for performing content analysis on the video component of the metadata. Process 800 comprises detecting video metadata at block 810.

Add block 820, image recognition software may be used to analyze the video frames of the uploaded video asset. Several image recognition and video analysis methods and software currently exist that can analyze video frames, determine temporal and spatial events, and determine content and context of the video.

At block 830, based on results of the image recognition and video analysis, the context of the video portion of the video asset is determined. A weighted score is then assigned at block 840. The weighted score varies depending on the context of the images of the video. For example, if the action in the video is more important that the audio, then the video portion would get a higher weighted score than the audio portion. However, if the video portion is not so important, such as two people sitting on a sofa and talking, then the audio is given higher weighted score than the images of the people sitting on the sofa.

FIGS. 9 and 10 are examples of generating and scoring preliminary hashtags, in accordance with some embodiments of the disclosure. FIG. 9 depicts a conversation between two individuals that are sitting next to each other and discussing a new shoe design. The design, which is an adjustable shoe, allows a kid to wear a shoe for three years even though their foot size grows over the three-year period. The two individuals are shown sitting on bar stools with a beach and palm trees in the background.

Applying the preliminary hashtags creation processes described above, the system will analyze this video asset for all associated metadata for generating preliminary hashtags. For simplicity, this example is limited to analysis of audio and video metadata only.

Based on the audio metadata analysis, at least the following keywords and phrases may be automatically selected by the system: new shoe, water, adjustable, seagull, shoe design, three years, outgrow, shoe size, launching, June 2021, 30% OFF. Based on the keywords and phrases automatically selected, at least the following hashtags may be created: "#newshoe," "#water," "#adjustableshoe," "# seagull," "#shoedesign," "#threeyears," "#outgrowshoesize," "#launch2021," and "#30% OFF." In one embodiment, the preliminary hashtags are a direct copy of the relevant keywords and phrases. In another embodiment, the preliminary hashtags maybe a refined form of the relevant keywords and phrases.

The video metadata analysis involves analyzing the video frames of an image depicted in the video asset. Since the video asset shows two individuals sitting next to each other on bar stools with the backdrop of a beach, the ocean, palm trees, a beach house, clouds over the water, and a sailboat, the system may create at least the following hashtags: "#beach," "#ocean," "#sailboat," "#Jack," "#Jill," "#discussionofnewshoe," "#palmtrees," and "#beachhouse."

An artificial intelligence (AI) algorithm may be used by the system 100 to determine the context of the video asset based on the keywords and phrases obtained through audio and video metadata analysis. For example, the context here may be a discussion of an adjustable shoe design. The AI algorithm may also create additional sub-topics in addition to the main context.

The preliminary hashtags may be analyzed for their relevancy based on the context created. Since the context relates to design of a new adjustable shoe, preliminary hashtags such as "#water," and "#seagull," obtained through audio metadata analysis, and preliminary hashtags such as "#beach," "#ocean," "#sailboat," "#palmtrees," and "#beachhouse," generated from the video/image analysis are given a lower relevancy and weighted score since they are not related to the context. On the other hand, preliminary hashtags "#newshoe," "#adjustableshoe," "#shoedesign," "#threeyears," "#outgrowshoesize," "#launch2021," "#30% OFF," "#Jack," "#Jill," and "#discussionofnewshoe" are given a higher relevancy and weighted score since they are directly related to the context.

Several preliminary hashtags may receive a high relevancy score, and then they may be further prioritized based on the weighted score given to each and used for sampling.

FIG. 10 depicts a group of individuals standing in front of the Eiffel Tower and discussing their tour. They are also having a general conversation about their day and how they got to the Eiffel Tower. They are also discussing the line behind them and the cost for taking the elevator up to the top of the Eiffel Tower.

Applying the preliminary hashtags creation processes described above, this video asset will be analyzed for all associated metadata for generating preliminary hashtags. For simplicity, this example is limited to analysis of audio and video metadata only.

Based on the audio metadata analysis, at least the following keywords and phrases that are underlined may be deemed relevant, and accordingly, the following preliminary hashtags may be automatically generated by the AI algorithm: "#tour," "#today," "#lastminute," "#biglinebehindus," "#getthereearlier," "#beattherush," "#AuntMary," "#sandwich," "#costs16.70euros," "#elevatortothetop," and "#coupon."

Although the audio metadata does not mention the Eiffel Tower, the AI algorithm analyzing the video metadata may recognize the backdrop as relevant and generate the following hashtags: #EiffelTower, #EiffelTowerTour, #EiffelTowerElevatorRide, #EiffelTowerCoupon etc.

An artificial intelligence (AI) algorithm may be used by the system 100 to determine the context of the video asset based on the keywords and phrases obtained through audio and video metadata analysis. For example, the context here may be taking a tour of the Eiffel Tower and a sub-topic, taking an elevator ride to the top of Eiffel tower. The AI algorithm may also create additional sub-topics in addition to the main context.

The audio and video, or other metadata associated with the video asset, may be analyzed together by the AI algorithm to fill in gaps, thereby allowing it to construct the context and generate preliminary hashtags that capture the content of the video asset. As seen in the discussion of FIG. 10, although Eiffel Tower was absent and not mentioned in the audio metadata analysis, it was picked up by the video metadata analysis and used to create the preliminary hashtag, given a high relevancy and weighted score, and likely used for sampling.

In contrast to FIG. 10, in FIG. 9, the beach background was not relevant to the context, even though the #beach and #palmtrees hashtags were generated based on the video metadata analysis. Because of this, the "#beach" and "#palmtrees" preliminary hashtags will be given a low relevancy and weighted score and likely not used for sampling.

FIG. 11 is a flowchart 1100 of a process for sampling the preliminary hashtag, in accordance with some embodiments of the disclosure. Sampling is a method of testing the effectiveness of the preliminary hashtag generated.

The process begins at block 1110, where the preliminary hashtag is used as a search term to find other video assets on the platform that include the same preliminary hashtag. The search may be refined by narrowing the search to selected search parameters.

Figure 12:
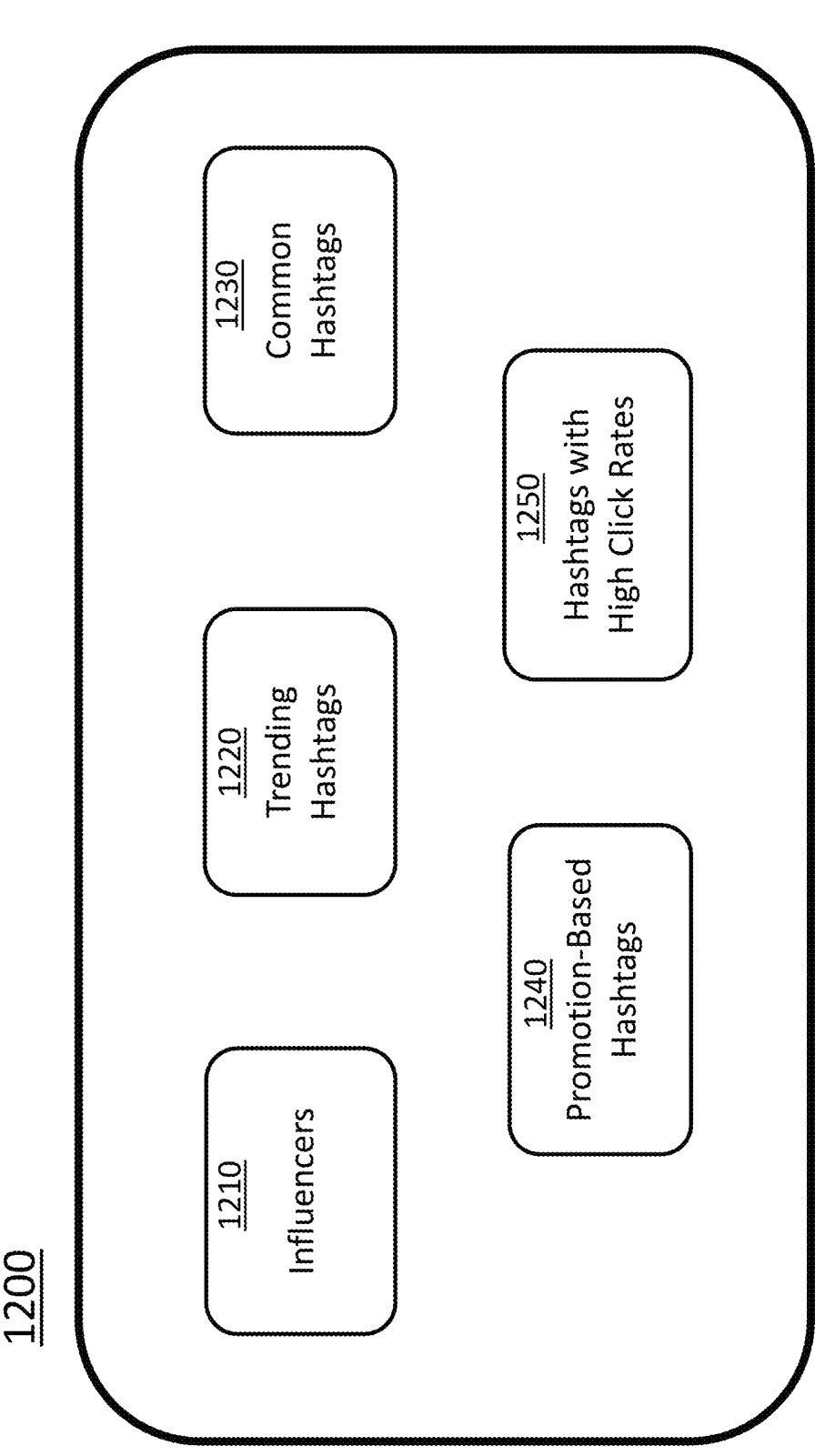
FIG. 12 is a block diagram of exemplary focus parameters used for sampling the preliminary hashtag, in accordance with some embodiments of the disclosure.

Some exemplary search parameters are provided in the discussion of FIG. 12. These include influencers 1210, trending hashtags 1220, common hashtags 1230, promotion-based hashtags 1240, and hashtags with high click rates 1250. When an influencer is selected as a search parameter, the process for sampling is described in the discussion of FIG. 13 below.

Once the search/sampling results in finding other video assets on the platform that include the same preliminary hashtag, at block 1120, if the sampling results in a large set of related videos, and a large set of hashtags from those videos that are to be added to the currently uploaded video, then process determines which hashtags to add based on grouping, ranking, and prioritization techniques. Accordingly, the sampling results are analyzed based on relevance and context, which was constructed by the AI algorithm during the generation of the preliminary hashtags.

The analysis includes evaluating hashtags used by the related videos. If a related video includes a hashtag that is also a preliminary hashtag generated by the system, then the same hashtag from the related video is viewed as a confirmation that the preliminary hashtag is effective. As such, the preliminary hashtag is retained and used for tagging the video asset.

If the related video includes a hashtag that is not a preliminary hashtag generated by the system, then the hashtag from the related video is analyzed for relevance and context. The hashtags from the related videos are scored and ranked, and the top-ranking hashtags are used to tag the video asset.

At block 1130, prior to tagging the video asset with the hashtag, a determination is made whether the total number of hashtags from related videos that are deemed relevant is above a predetermined threshold number of hashtags that can be used to tag the video asset. In one embodiment, if the number of hashtags from the related videos exceeds the threshold number, then at block 1140, the hashtags are scored based on their relevance to the context of the video asset, prioritized based on the scoring (weighted scoring). Then, at block 1150, a selected number of hashtags, within the threshold number with the highest weighted scores are selected for tagging the video asset. If the number of hashtags from the related videos does not exceed the threshold number, then at block 1150, all the relevant hashtags are used for tagging the video asset.

Although having a large number of hashtags helps the content to be found in more search results, having too many hashtags is not effective, because then the video is not focused and may show up in search results that are not as relevant. Thus, it is desirable to have an optimal number of hashtags that are focused and adequate to drive viewership.

In another embodiment, if a determination is made that the total number of hashtags to be added exceeds the predetermined threshold, then a determination is made of whether any of the hashtags can be grouped together. If a grouping is possible based on the relevance and close association between hashtags, then hashtags are grouped together.

FIG. 12 is a block diagram 1200 of exemplary parameters used for sampling the preliminary hashtag, in accordance with some embodiments of the disclosure. The parameters are used to refine and focus the search such that related videos with the selected parameters may be used for sampling the preliminary hashtags.

Influencers 1210 is one of the exemplary parameters that can be used to focus the search of related videos such that the preliminary hashtags can be sampled for their effectiveness. The process of selecting an influencer for sampling is described in the discussion of FIG. 13.

Trending hashtags 1220 is in one of the exemplary parameters that can be used to focus the search of related videos such that the preliminary hashtags can be sampled for their effectiveness. These are popular hashtags that have a high viewership on the platform. If the system determines that a hashtag of a related video is trending, then the trending hashtag can be used to tag the video asset.

Common hashtags 1230 is one of the exemplary parameters that can be used to focus the search of related videos such that the preliminary hashtags can be sampled for their effectiveness. When several related videos include a hashtag that is common in the related videos but not a preliminary hashtag, then the common hashtag may be viewed as popular. If a common hashtag is detected, the system may select the common hashtag for tagging the video asset.

Promotion-based hashtags 1240 is one of the exemplary parameters that can be used to focus the search of related videos such that the preliminary hashtags can be sampled for their effectiveness. These hashtags relate to promotions, discounts, coupons, or paid advertising. Typically, promotion-based hashtags have a high viewership, so when such a hashtag is detected, the system may select it for tagging the video asset.

Hashtags with high click rates 1250 is one of the exemplary parameters that can be used to focus the search of related videos such that the preliminary hashtags can be sampled for their effectiveness. These are hashtags associated with video content or links to video content that have been selected by a large volume of viewers. When such a hashtag is detected, the system may select it for tagging the video asset.

Although a few exemplary parameters are described in the discussion of FIG. 12, other hashtag parameters may also be selected to focus the sampling search. Once the hashtags have been sampled, the preliminary hashtags are either finalized as final hashtags, or deleted due to their non-effectiveness, or additional hashtags from related videos are used to tag the video asset.

Once a video asset is tagged with a hashtag, the hashtag is periodically, or at a predetermined interval or occurrence of an event, sampled again and refined based on related videos found. The feedback loop involving periodic sampling and updating keeps the hashtag relevant and effective. The hashtag may also be updated by year or event to keep it fresh, such as #EiffelTowerTour1998 may be refreshed as #EiffelTowerTour2021 to keep it relevant in the year 2021.

Alternatively, once a video asset is tagged with a hashtag, the system may be configured such that the tagged hashtag is made final and is not updated periodically. Such an update override may be programed into the system to retain the final hashtag in its original form. The update override may be turned ON and OFF as desired.

FIG. 13 is a flowchart of a process for selecting an influencer for sampling the preliminary hashtag, in accordance with some embodiments of the disclosure.

Process 1300 describes a method of automatically searching for an influencer that is related to, or in the same space as, the content of the video asset. Influencers are thought leaders within a particular industry that have a large reach and a loyal following. Leveraging influencers for your posted content is a highly effective strategy to promote the content and gain high visibility. Since postings from influencers are considered to be more trustworthy than any other form of advertising, following an influencer and using the hashtags used by the influencer for the uploaded video asset helps drive internet traffic to the posted video asset.

The process begins at block 1310, where the system obtains the preliminary hashtag generated. As described earlier, the preliminary hashtag was generated based on content analysis of the metadata associated with the video asset.

At block 1320, the preliminary hashtag is used for searching influencers in the same field as the video asset. In one embodiment, the system identifies influencers that have used the same or similar hashtags on their posted content. The system then generates a list of influencers that have similar hashtags. In another embodiment, the title of the video asset, the topic or subtopics, or other metadata associated with the video asset are used to identify influencers in the same field.

At block 1330, one or more influencers from the list of influencers are selected by the system. In the event the search for influencers results in a large list, the list is called based on relevance, and the top influencers in the list are selected.

Add block 1340, content posted by the influencers is analyzed. For example, a video asset posted by the influencer that has the same hashtag as the preliminary hashtag is further examined. In addition to the same hashtag, if the influencer has tagged their posted video asset with additional hashtags that are not used with the user uploaded video asset, then the additional hashtags are further examined at block 1350 to determine whether to add the additional hashtags to the video content associated with the preliminary hashtag. If the additional hashtags seem relevant to the content of the video asset then the additional hashtags can be added to the video content if they conform to the platform policy and are approved by the user.

Figure 14:
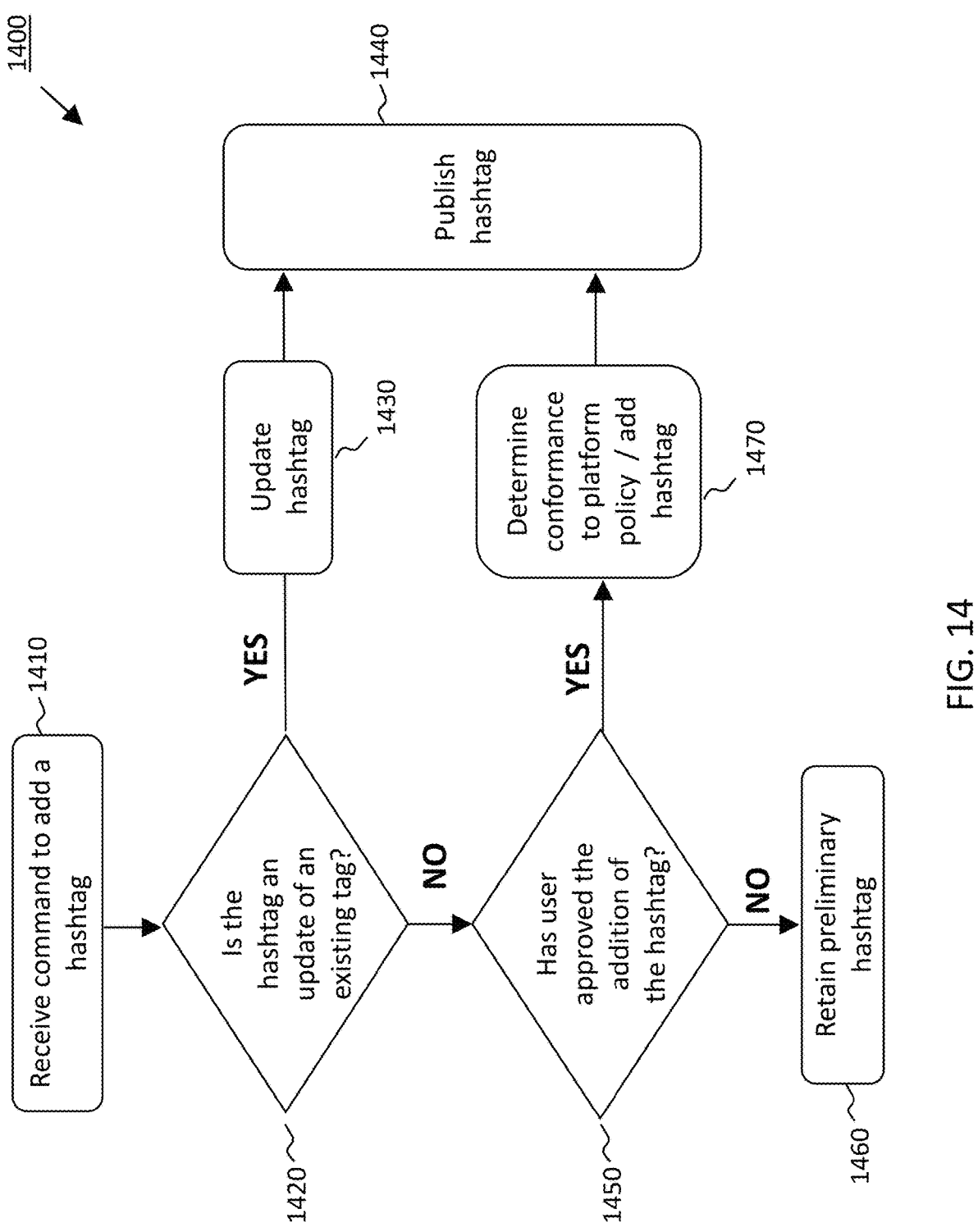
FIG. 14 is a flowchart of a process for tagging the video asset with an updated or new hashtag, in accordance with some embodiments of the disclosure.

FIG. 14 is a flowchart of a process for tagging the video asset with an updated or new hashtag, in accordance with some embodiments of the disclosure. The systems disclosed provide at least two methods for tagging the uploaded video asset with hashtags.

In one embodiment, as described earlier, one method of tagging the video asset includes generating preliminary hashtags based on content analysis, sampling each generated preliminary hashtag with related videos, and then, based on the sampling results, modifying or replacing the preliminary hashtag with a hashtag from the related video, or adding new hashtags to the video content, where the new hashtags were tagged to the related videos but not the uploaded video asset.

In another embodiment, once a video asset is tagged with a hashtag, the hashtag is updated or refreshed to make it current. For example, #cake may be updated and refreshed to #Halloweencake such that the older video asset relating to baking a cake is made current and relevant during the upcoming Halloween. Likewise, #Christmasdecorations maybe updated and refreshed to #Christmasdecorations2021 or #Christmasdecorations (Current Year) such that an old, uploaded Christmas decorations video is made relevant to current times.

Process 1400 describes the tagging of both new hashtags that were obtained based on sampling analysis and refreshed hashtags that are used to make the content current and relevant.

At block 1410, the system receives a command to add a hashtag. At block 1420, the system determines whether the preliminary hashtag is to be refreshed and updated to make it current or, based on the sampling analysis, modified or replaced, or another new hashtag is to be added.

If a determination is made at block 1420 that the preliminary hashtag is to be refreshed and updated to make it current, then the system automatically updates the hashtag at block 1430 and publishes the hashtag at block 1440.

If a determination is made at block 1420 that the preliminary hashtag is to be modified or replaced, or another new hashtag is to be added, then at block 1450, a notification is provided to the user for approving the modification, replacement, or addition of a new hashtag.

If the user does not approve the modification, replacement, or addition of the new hashtag, then at block 1460, no changes are made to the preliminary hashtag, and the preliminary hashtag is retained.

If the user approves the modification, replacement, or addition of the new hashtag at block 1450, then a determination is made whether the modification, replacement, or addition of the new hashtag meets the platform policy where the video asset is uploaded. The platform policy may have its own rules and regulations, including ensuring that no foul language, illegal language, or any other inappropriate language is used.

If the hashtag to be modified, replaced, or added meets the platform policy, then at block 1440 the hashtag is published.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
   receiving an indication of an upload of a first video asset, and metadata associated with the first video asset, to an online platform;
   analyzing the metadata to automatically generate a plurality of preliminary hashtags;
   publishing a preliminary hashtag from the plurality of preliminary hashtags for the first video asset uploaded to the online platform; and
   as a part of a periodically performed update:
      using the preliminary hashtag, from the plurality of preliminary hashtags, as a search term to automatically search the online platform for:
         a plurality of second video assets that were previously uploaded to the online platform that are each tagged with both: (a) the preliminary hashtag and (b) at least one additional hashtag that is different from the preliminary hashtag, and wherein the search is refined by narrowing the search to a subset of videos are selected based on traffic rates on the online platform;
      for each second video asset in the plurality of second video assets that were identified by the search of the subset of videos: analyzing the second video asset to determine that the preliminary hashtag is to be replaced with the at least one additional hashtag that is different from the preliminary hashtag; and
      based at least in part on the analyzing:
         deleting the preliminary hashtag from the published first video asset; and automatically tagging the first video asset with the at least one additional hashtag of the second video asset that is different from the preliminary hashtag.

2. The method of claim 1, further comprising analyzing the metadata to construct a context of the first video asset.

3. The method of claim 2, further comprising scoring each preliminary hashtag, from the plurality of preliminary hashtags, based on its relevance to the context of the first video asset.

4. The method of claim 3, further comprising:
   determining if the plurality of generated preliminary hashtags exceeds a predetermined threshold; and
   in response to determining that the plurality of generated preliminary hashtags exceeds the predetermined threshold:
      selecting the highest scored preliminary hashtags within the predetermined threshold for searching the online platform for the plurality of second video assets.

5. The method of claim 2, wherein the analyzing the second video asset to determine that the preliminary hashtag is to be replaced with the at least one additional hashtag that is different from the preliminary hashtag further comprises:
   determining that the at least one additional hashtag of the second video asset is relevant to the context of the first video asset.

6. The method of claim 1, further comprising selecting an influencer on the online platform to focus the search for the plurality of second video assets and copying a hashtag of a video asset posted by the influencer to tag the first video asset.

7. The method of claim 1, further comprising selecting a search parameter to focus the search for the plurality of second video assets, wherein the search parameter is selected from a group comprising: influencer, common hashtag, promotion-based hashtag, trending hashtag, and hashtag with high click rate.

8. The method of claim 1, wherein a policy of the online platform is used to determine language appropriateness of the at least one additional hashtag of the second video asset.

9. The method of claim 1, wherein the metadata is selected from a group consisting of: audio, video, hashtags, genre, closed caption, promotional content, user provided metadata, and system generated metadata.

10. The method of claim 1, wherein tagging the first video asset with the at least one additional hashtag of the second video asset is performed in response to receiving user approval for the tagging.

11. The method of claim 1, further comprising:
   performing a sentiment analysis on the at least one additional hashtag of the second video asset, wherein the sentiment analysis is used to analyze any one or more of emotion, review, tone, positivity, and negativity associated with the at least one additional hashtag of the second video asset.

12. The method of claim 1, wherein the analyzing the metadata to automatically generate the plurality of preliminary hashtags comprises:
   analyzing frames of the first video asset to identify key visual characteristics;
   generating a first set of preliminary hashtags based on the identified key visual characteristics;
   creating a context data structure based at least in part on an analysis of a transcript of the first video asset;
   based on the context data structure, assigning a relevance score to each preliminary hashtag of the first set of preliminary hashtags, wherein a first subset of the first set of preliminary hashtags is assigned a relevance score indicating the subset is not to be included in the plurality of preliminary hashtags; and generating the plurality of preliminary hashtags based on the first set of preliminary hashtags and the relevance score of each preliminary hashtag, wherein the plurality of preliminary hashtags does not include the first subset.

13. The method of claim 1, wherein the periodically performed update further comprises:

updating the preliminary hashtag of the first video asset with an updated hashtag that is different than the preliminary hashtag wherein the updated hashtag comprises:

(a) at least a portion of text of the preliminary hashtag; and (b) an addition text portion relevant to at least one of a) the current year, or b) a current event relevant to the first video asset.

14. The method of claim 1, wherein the subset of videos that are selected based on traffic rates are determined based on click rate information or volume of viewers information.

15. A system comprising:

communication circuitry configured to access a first video asset uploaded on an online platform; and control circuitry configured to:

receive an indication of an upload of the first video asset, and metadata associated with the first video asset, to the online platform;

analyze the metadata to automatically generate a plurality of preliminary hashtags;

publish a preliminary hashtag from the plurality of preliminary hashtags for the first video asset uploaded to the online platform; and as a part of a periodically performed update:

use the preliminary hashtag, from the plurality of preliminary hashtags, as a search term to automatically search the online platform for:

a plurality of second video assets that were previously uploaded to the online platform that are each tagged with both: (a) the preliminary hashtag and (b) at least one additional hashtag that is different from the preliminary hashtag, and wherein the search is refined by narrowing the search to a subset of videos that care selected based on rates traffic rates on the online platform;

for each second video asset in the plurality of second video assets that were identified by the search of the subset of videos: analyze the second video asset to determine that the preliminary hashtag is to be replaced with the at least one additional hashtag that is different from the preliminary hashtag; and based at least in part on the analyzing:

delete the preliminary hashtag from the published first video asset; and automatically tag the first video asset with the at least one additional hashtag of the second video asset.

16. The system of claim 15, wherein the control circuitry is further configured to analyze the metadata to construct a context of the first video asset.

17. The system of claim 16, wherein the control circuitry is further configured to score each preliminary hashtag, from the plurality of preliminary hashtags, based on its relevance to the context of the first video asset.

18. The system of claim 17, wherein the control circuitry is further configured to:

determine if the plurality of generated preliminary hashtags exceeds a predetermined threshold; and in response to determining that the plurality of generated preliminary hashtags exceeds the predetermined threshold:

select the highest scored preliminary hashtags within the predetermined threshold for searching the online platform for the plurality of second video assets.

19. The system of claim 16, wherein the control circuitry is configured to analyze the second video asset to determine that the preliminary hashtag is to be replaced with the at least one additional hashtag that is different from the preliminary hashtag by:

determining that the at least one additional hashtag of the second video asset is relevant to the context of the first video asset.

* * * * *